(12) United States Patent
Graves et al.

(10) Patent No.: US 11,187,362 B2
(45) Date of Patent: Nov. 30, 2021

(54) CONDUIT CONNECTOR ASSEMBLY

(71) Applicant: Acorn Engineering Company, City of Industry, CA (US)

(72) Inventors: Jim Graves, Libertyville, IL (US); Boris Quijada, Beach Park, IL (US)

(73) Assignee: Acorn Engineering Company, City of Industry, CA (US)

( * ) Notice: Subject to any disclaimer, the term of this patent is extended or adjusted under 35 U.S.C. 154(b) by 840 days.

(21) Appl. No.: 15/621,610

(22) Filed: Jun. 13, 2017

(65) Prior Publication Data

US 2017/0356573 A1 Dec. 14, 2017

Related U.S. Application Data

(60) Provisional application No. 62/349,904, filed on Jun. 14, 2016.

(51) Int. Cl.
| | |
|---|---|
| *F16L 19/08* | (2006.01) |
| *F16L 19/065* | (2006.01) |
| *F16L 37/10* | (2006.01) |
| *F16L 15/04* | (2006.01) |
| *F16L 37/02* | (2006.01) |
| *F16L 37/08* | (2006.01) |

(52) U.S. Cl.
CPC ............... *F16L 37/10* (2013.01); *F16L 15/04* (2013.01); *F16L 19/065* (2013.01); *F16L 19/083* (2013.01); *F16L 37/02* (2013.01); *F16L 37/08* (2013.01)

(58) Field of Classification Search
CPC . F16L 15/04; F16L 37/10; F16L 37/02; F16L 19/065; F16L 19/083

USPC .......................................................... 285/340
See application file for complete search history.

(56) References Cited

U.S. PATENT DOCUMENTS

| | | | | |
|---|---|---|---|---|
| 1,440,207 | A | * 12/1922 | Burns ................... | F16L 19/086 |
| | | | | 285/340 |
| 2,158,757 | A | * 5/1939 | Kuestermeier ....... | F16L 19/083 |
| | | | | 285/340 |
| 3,259,406 | A | 7/1966 | Kish | |
| 3,312,483 | A | * 4/1967 | Leadbetter ............ | F16L 19/086 |
| | | | | 285/340 |
| 3,312,484 | A | * 4/1967 | Davenport ............ | F16L 37/091 |
| | | | | 285/340 |

(Continued)

*Primary Examiner* — James M Hewitt, II
(74) *Attorney, Agent, or Firm* — Eric J. Sosenko; Jonathan P. O'Brien; Honigman LLP

(57) ABSTRACT

A connector assembly includes a first connector, a compression member, a retainer, and a second connector. The first connector includes a first coupling portion, a proximal opening, and an annular inner surface extending from the proximal opening. The compression member includes an inner surface and an outer surface. The outer surface is configured to sealingly engage the annular inner surface of the first connector. The retainer includes a ring portion and a plurality of teeth. The ring portion includes a proximal end and a distal end. Each of the plurality of teeth extends from the distal end and is configured to engage the compression member. The second connector includes a second coupling portion and an engagement surface. The second coupling portion is configured to engage the first coupling portion. The engagement surface is configured to engage the proximal end of the retainer.

8 Claims, 5 Drawing Sheets

(56) References Cited

U.S. PATENT DOCUMENTS

| | | | | |
|---|---|---|---|---|
| 3,429,596 | A | * | 2/1969 | Marshall ............... F16L 19/086 285/340 |
| 3,633,944 | A | * | 1/1972 | Hamburg ............... F16L 17/035 285/81 |
| 4,000,919 | A | * | 1/1977 | Edwards ............... F16L 37/091 285/111 |
| 4,082,326 | A | | 4/1978 | Bryson |
| 4,655,486 | A | * | 4/1987 | Tarnay ................. F16L 19/065 285/334.4 |
| 4,676,533 | A | | 6/1987 | Gerondale |
| 4,798,404 | A | * | 1/1989 | Iyanicki ............... F16L 19/075 285/12 |
| 5,342,096 | A | | 8/1994 | Bachle et al. |
| 5,553,901 | A | * | 9/1996 | Serot ...................... F16L 19/12 285/322 |
| 7,232,159 | B2 | * | 6/2007 | O'Neill ................. F16L 37/091 285/340 |
| 7,878,555 | B2 | * | 2/2011 | Oh ........................ F16L 19/086 285/319 |
| 8,303,001 | B2 | * | 11/2012 | Oh ...................... F16L 25/0045 285/340 |
| 8,807,601 | B2 | | 8/2014 | Anderson |
| 2004/0090067 | A1 | | 5/2004 | Pridham |
| 2006/0125236 | A1 | | 6/2006 | Cuvo et al. |
| 2014/0152002 | A1 | | 6/2014 | Crompton et al. |

\* cited by examiner

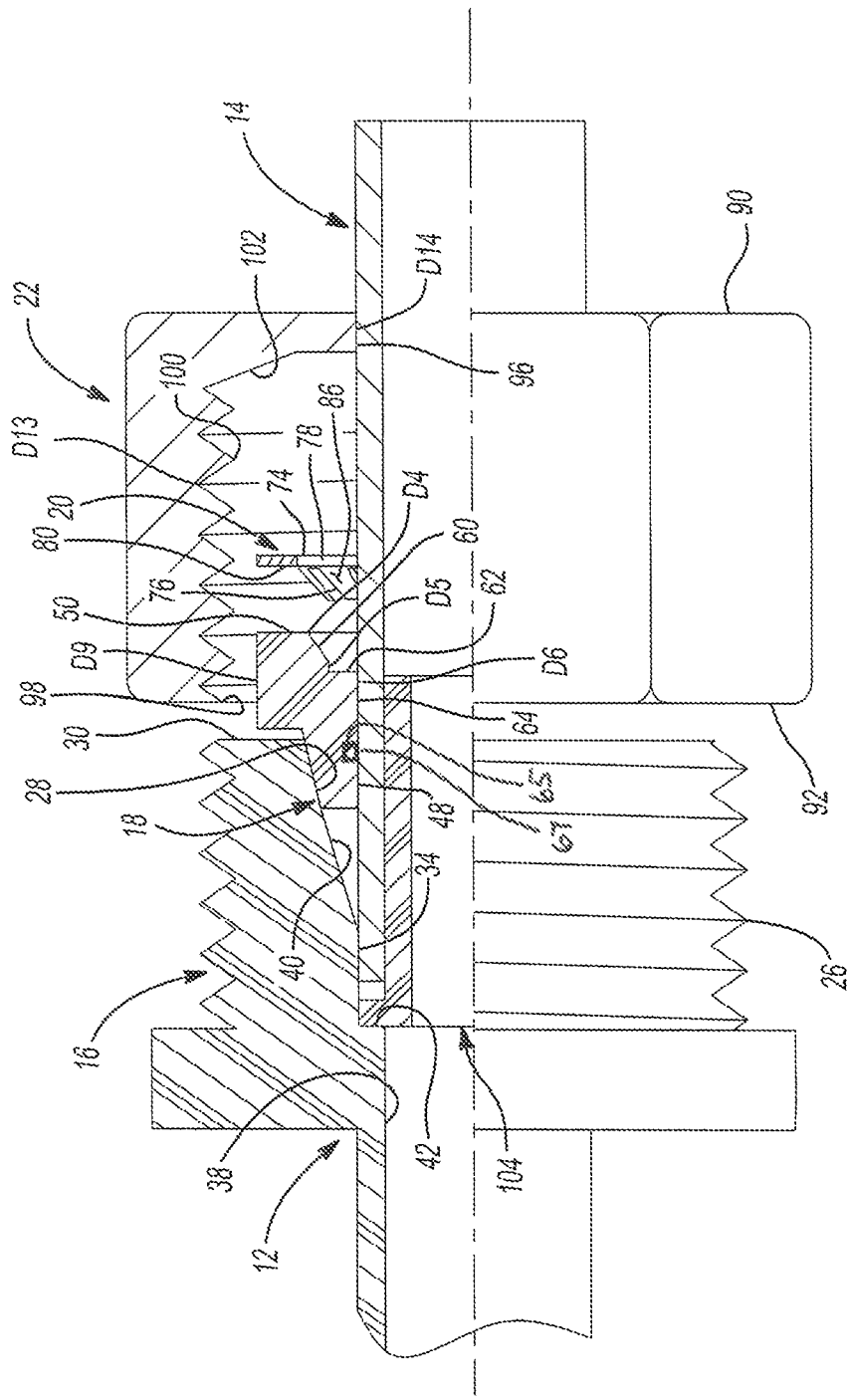

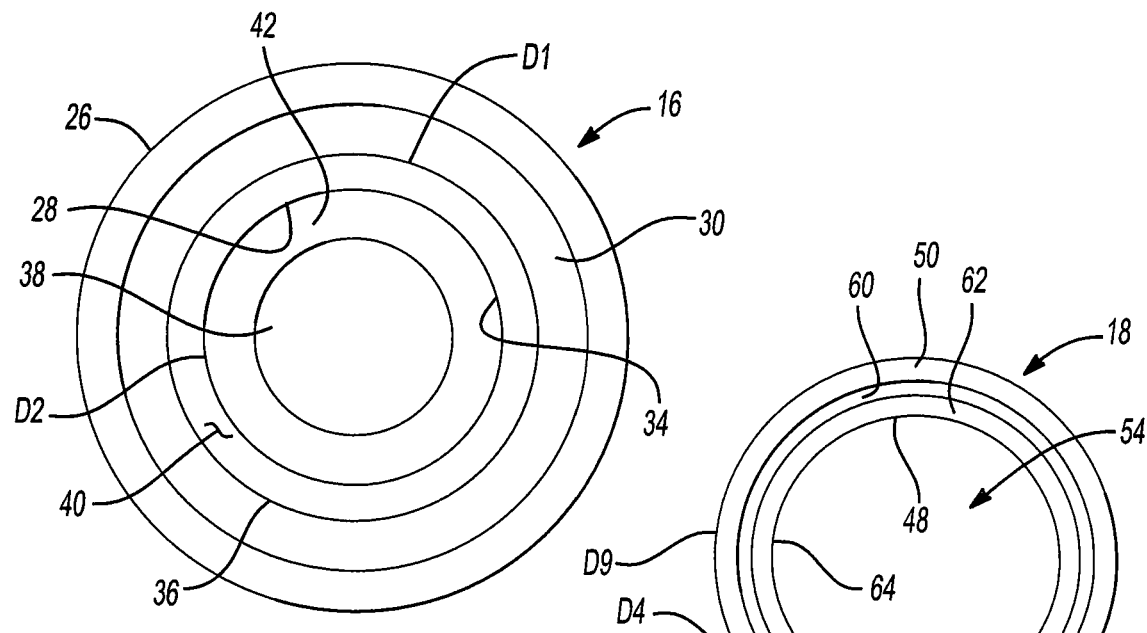
Fig-3
Fig-4
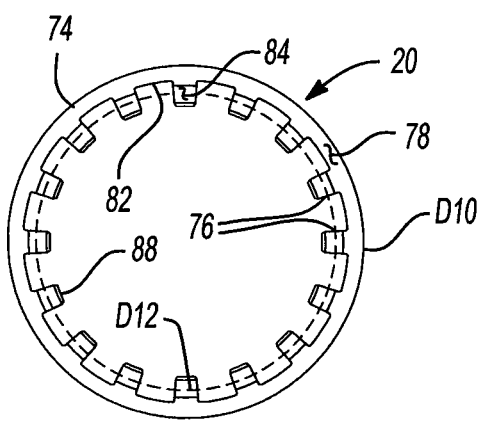
Fig-5
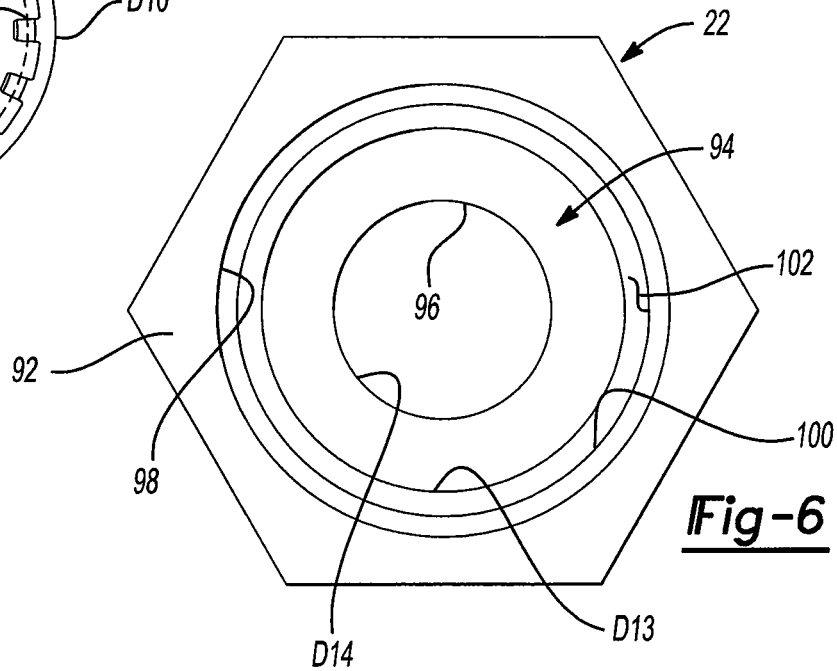
Fig-6

CONDUIT CONNECTOR ASSEMBLY

CROSS REFERENCE TO RELATED APPLICATION

This application is a non-provisional application claiming priority to U.S. Patent Application No. 62/349,904, filed Jun. 14, 2016, the entire contents of which are herein incorporated by reference.

BACKGROUND

1. Field of the Invention

The present disclosure relates to a conduit connector assembly and, more particularly, to quick connect conduit connector assembly having a compression member and a retainer.

2. Description of Related Technology

This section provides background information related to the present disclosure and is not necessarily prior art.

Various types of connectors and connector assemblies are used to couple one conduit to another conduit. For example, in some plumbing applications, threaded connectors may be used to couple a first supply line to a second supply line, or to couple a first drain line to a second drain line. In other plumbing applications, a press-fit connector may be used to couple a first supply line to a second supply line, or to couple a first drain line to a second drain line. In such applications, it may be necessary to utilize a tool to remove the first supply line from the second supply line. In yet other plumbing applications, a soldered joint may be used to couple a first supply line to a second supply line.

While conventional conduit connector assemblies may have proven useful for their intended purposes, a continuous need for improvement in the relevant art remains.

SUMMARY

This section provides a general summary of the disclosure and is not a comprehensive disclosure of its full scope or all of its features.

According to one aspect, a connector assembly is provided. The connector assembly includes a first connector, a compression member, a retainer, and a second connector. The first connector further includes a first coupling portion, a proximal opening, and an annular inner surface extending from the proximal opening. The compression member includes an inner surface and an outer surface. The outer surface is configured to sealingly engage the annular inner surface of the first connector. The retainer includes a ring portion and a plurality of teeth. The ring portion includes a proximal end and a distal end. Each of the plurality of teeth extends from the distal end and is configured to engage the compression member. The second connector include a second coupling portion and an engagement surface. The second coupling portion is configured to engage the first coupling portion. The engagement surface is configured to engage the proximal end of the retainer.

In one implementation, the first connector includes a male threaded portion and the second connector includes a female threaded portion configured to engage the male threaded portion.

In some implementations, the inner surface of the compression member is configured to sealingly engage an outer surface of a conduit.

In a further implementation, the inner surface of the compression member is configured to retain a sealing member that is configured to sealingly engage an outer surface of a conduit.

In another implementation, each of the plurality of teeth is configured to engage the outer surface of the conduit.

In a further implementation, the inner surface of the compression member includes a tapered portion extending from the proximal end.

In yet a further implementation, an outer surface of each of the plurality of teeth is configured to engage the tapered portion of the inner surface of the compression member.

In still another implementations, the engagement surface is operable to apply an axially-extending force on the proximal end of the retainer.

In one implementation, the engagement surface tapers radially inwardly.

In some implementation, the compression member is operable to apply a radially-extending force on each of the plurality of teeth.

In another implementation, the first connector is operable to apply a radially-extending force on the outer surface of the compression member.

In additional implementation, the annular inner surface of the first connector tapers radially inwardly from the opening.

In a further implementation, the inner surface of the compression member includes an annular tapered portion, each of the plurality of teeth configured to engage the annular tapered portion.

According to another aspect, a kit is provided. The kit may include a first connector, a first compression member, a first retainer, a second compression member, and a second retainer. The first connector has a threaded coupling portion and an engagement surface. The first compression member may include a first inner surface and a first outer surface. The first inner surface includes a first frustoconical portion defining a first diameter and a first distal portion defining a second diameter. The first retainer includes a first ring portion and a first plurality of teeth extending from the first ring portion. Each of the first plurality of teeth include a first tapered outer surface and a first tapered inner surface. The first tapered outer surface is configured to engage the first frustoconical portion of the first compression member. The first tapered inner surface defines a third diameter. The second compression member includes a second inner surface and a second outer surface. The second inner surface includes a second frustoconical portion defining a fourth diameter and a second distal portion defining a fifth diameter. The fourth diameter is greater than the first diameter. The fifth diameter is greater than the second diameter. The second retainer includes a second ring portion and a second plurality of teeth extending from the second ring portion. Each of the second plurality of teeth includes a second tapered outer surface and a second tapered inner surface. The second tapered outer surface is configured to engage the second frustoconical portion of the second compression member. The second tapered inner surface defines a sixth diameter greater than the third diameter.

In some implementations, the first ring portion includes a first proximal end configured to engage the engagement surface of the first connector, and the second ring portion includes a second proximal end configured to engage the engagement surface of the first connector. The first proximal end may define a first outer diameter. The second proximal end may define a second outer diameter equal to the first outer diameter.

In other implementations, the first outer surface is configured to sealingly engage a second connector. In some implementations, the second outer surface is configured to sealingly engage the second connector. The first connector may include a first threaded coupling portion and the second connector may include a second threaded coupling portion configured to engage the first threaded coupling portion.

In a another implementation, the inner surfaces of the first and second compression member are respectively configured to retain first and second sealing members that are configured to sealingly engage outer surfaces of conduits of different outer diameters.

In further implementations, the engagement surface is operable to apply an axially-extending force on the first proximal end of the first retainer and on the second proximal end of the second retainer.

According to yet another aspect, a connector assembly is provided. The connector assembly includes a first connector, a compression member, a retainer and a second connector. The first connector includes a proximal opening and a first threaded coupling portion. The proximal opening includes a first diameter. The first threaded coupling portion includes a second diameter greater than the first diameter. The compression member has a proximal end, a distal end opposite the proximal end, and a frustoconical outer surface extending from the distal end. The proximal end includes a first opening defining a third diameter. The frustoconical outer surface defines a fourth diameter and a fifth diameter. The fourth diameter is less than the first diameter and is disposed proximate the distal end. The fifth diameter is greater than the first diameter and disposed between the proximal end and the distal end. The retainer has a ring portion and a plurality of teeth supported by the ring portion. The ring portion includes an inner diameter and an outer diameter. Each of the plurality of teeth has an inner surface and an outer surface extending from the ring portion to a distal end. The outer surface defines a sixth diameter and a seventh diameter. The sixth diameter is less than the third diameter and is disposed proximate the distal end. The seventh diameter is greater than the sixth diameter and is disposed between the ring portion and the distal end. The second connector include a second threaded coupling portion and an engagement surface. The second threaded coupling portion defines an eighth diameter greater than the outer diameter. The second threaded coupling portion is configured to engage the first threaded coupling portion. The engagement surface extends radially inward relative to the eighth diameter and is configured to engage the ring portion.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The drawings described herein are for illustrative purposes only of selected configurations and are not intended to limit the scope of the present disclosure.

FIG. 1A is a partial section view of a conduit connector assembly having a connector arranged at a first location in accordance with the principles of the present disclosure;

FIG. 3 is an end view of a first connector of the conduit connector assembly of FIG. 1A;

FIG. 4 is an end view of a compression member of the conduit connector assembly of FIG. 1A;

FIG. 5 is an end view of a retainer of the conduit connector assembly of FIG. 1A;

FIG. 6 is an end view of a second connector of the conduit connector assembly of FIG. 1A.

Corresponding reference numerals indicate corresponding parts throughout the drawings.

DETAILED DESCRIPTION

Figure 1B:
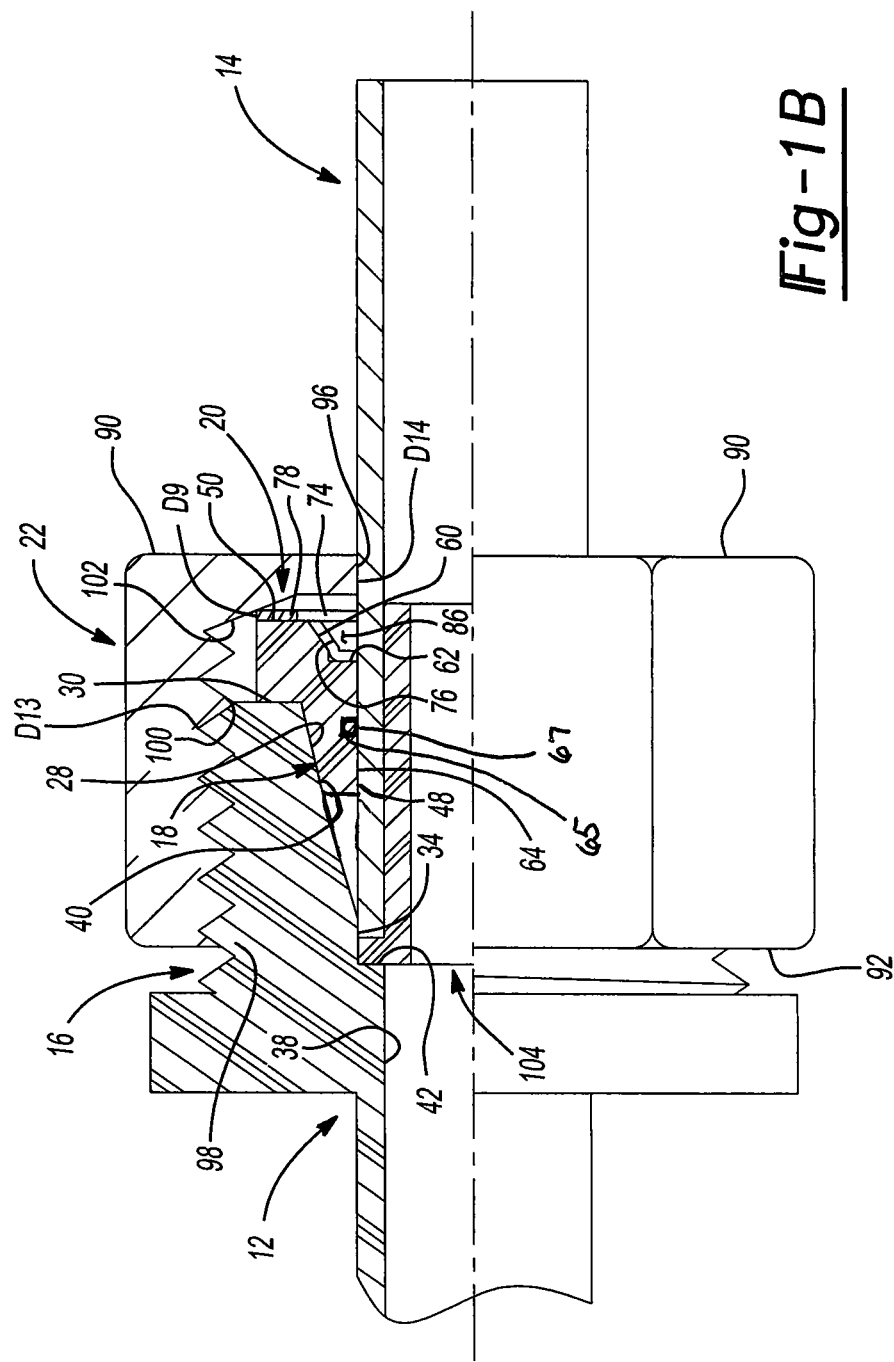
FIG. 1B is a partial section view of the conduit connector assembly of FIG. 1A showing the connector arranged at a second location in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Figure 2:
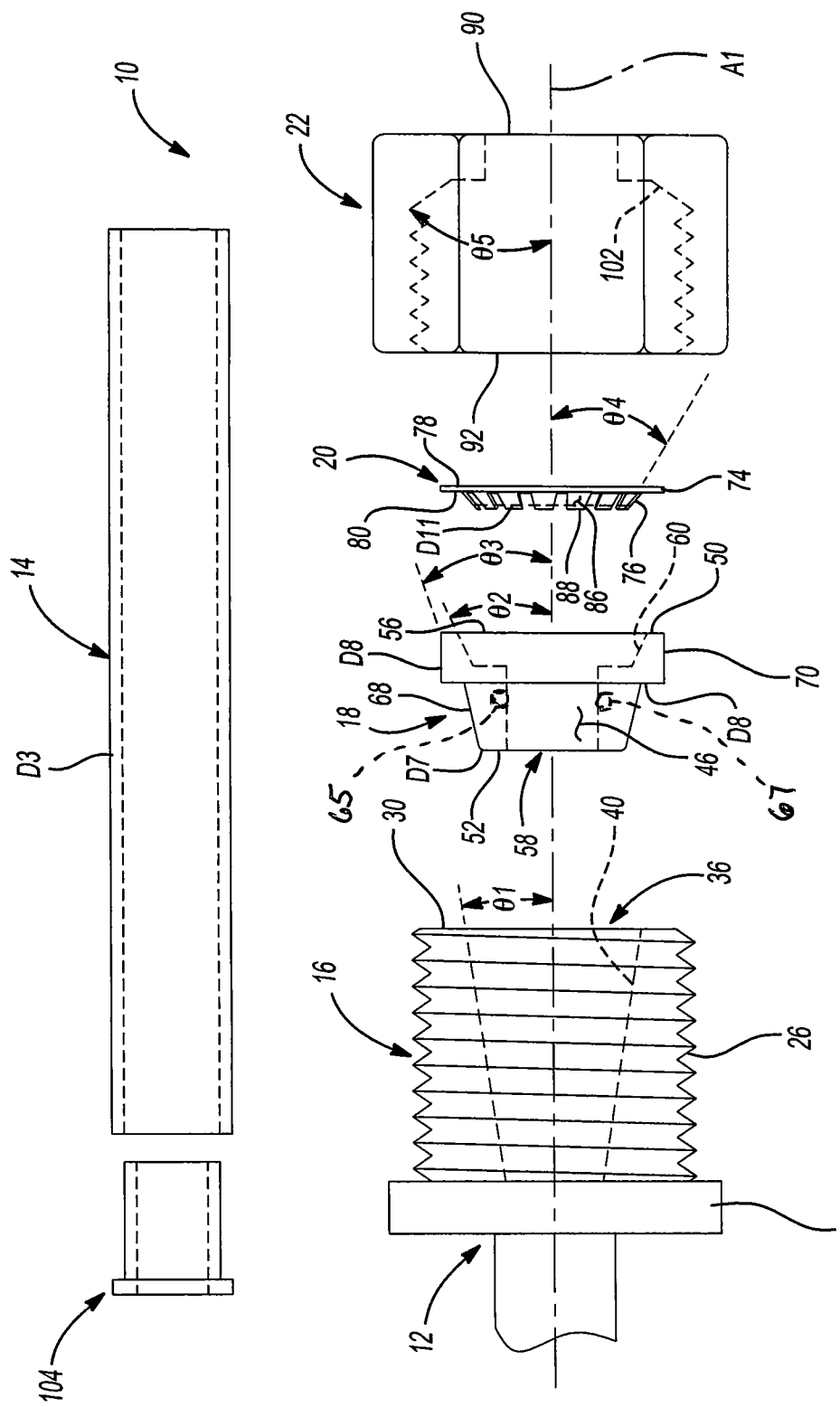
FIG. 2 is an exploded view of the conduit connector assembly of FIG. 1A.

With reference to FIGS. 1A, 1B and 2, a connector assembly 10 is provided. The connector assembly 10 is used to couple a first conduit 12 to a second conduit 14. In some implementations, the connector assembly 10 may be configured for a plumbing application (e.g., water supply conduits or water drainage conduits), such that the first conduit 12 may include one of a copper or composite (e.g., polymer composite) pipe and the second conduit 14 may include one of a copper or composite (e.g., polymer composite) pipe. It will be appreciated, however, that the connector assembly 10 may be utilized in other applications, such as transporting a gas or other material, for example.

The connector assembly 10 includes a first connector 16, a compression member 18, a retainer 20, and a second connector 22. The first connector 16 is coupled to the first conduit 12. In particular, in some configurations, the first connector 16 may be integrally (e.g., monolithically) formed with the first conduit 12. For example, in some implementations, the first conduit 12 and the first connector 16 may collectively form at least a portion of a valve assembly or a tee fitting.

The first connector 16 includes a threaded male portion 26, a female portion 28, a proximal end 30, and a distal end 32. The male and/or female portions 26, 28 extends from the proximal end 30 to the distal end 32. In this regard, the female portion 28 defines a passage 34 extending from the proximal end 30 to the distal end 32, and in fluid communication with the first conduit 12. In particular, the proximal end 30 includes a proximal opening 36 in fluid communication with the passage 34, and the distal end 32 includes a distal opening 38 in fluid communication with the passage 34. The female portion 28 further include an annular tapered (e.g., frustoconical) surface 40 diverging radially inwardly in a direction from the proximal end 30 toward the distal end 32. As illustrated in FIG. 2, the tapered surface 40 may define an angle θ1 relative to a longitudinally extending axis A1 of the connector assembly 10. The angle θ1 may be between ten degrees and sixty degrees. In some implementations, the angle θ1 may be substantially equal to thirty degrees. In this regard, the tapered surface 40 defines a gradually decreasing diameter, including a first diameter D1 proximate the proximal opening 36, and a second diameter D2, which is less than the first diameter D1, proximate the passage 34. In some implementations, the second diameter D2 may be substantially equal to (+/−5%) an outer diameter D3 of the first conduit 12. The distal end 32 of the first connector 16 may include a stop 42, defining a surface extending radially inwardly from the passage 34.

The compression member 18 has an outer surface 46, an inner surface 48, a proximal end 50, and a distal end 52. The inner surface 48 defines a passage 54 extending from the proximal end 50 to the distal end 52. In some implementations, the inner surface 48 may exhibit a high coefficient of friction. In this regard, the inner surface 48 may include a coating (not shown) exhibiting a high coefficient of friction.

In the assembled state, the passage 54 of the compression member 18 is in fluid communication with the passage 34 of the first connector 16. In this regard, the proximal end 50 includes a proximal opening 56 in fluid communication with the passage 54, and the distal end 52 includes a distal opening 58 in fluid communication with the passage 54.

The inner surface 48 of the compression member 18 includes (i) an annular tapered (e.g., frustoconical) portion 60 diverging radially inwardly from the proximal end 50, (ii) a stop portion 62 extending radially inwardly from the tapered portion 60, and (iii) a distal portion 64 extending axially from the stop portion 62. As illustrated in FIG. 2, the tapered portion 60 may define an angle θ2 relative to the axis A1 of the connector assembly 10. The angle θ2 may be between ten degrees and sixty degrees. In some implementations, the angle θ2 may be substantially equal to thirty degrees. In this regard, the tapered portion 60 may define a gradually decreasing diameter, including a fourth diameter D4 proximate the proximal opening 56, and a fifth diameter D5, less than the fourth diameter D4, proximate the stop surface 62. The stop surface 62 may extend radially inwardly (e.g., substantially perpendicular to the axis A1) from the fifth diameter D5 to a sixth diameter D6 less than the fifth diameter D5. The distal portion 64 may be defined at least in part by the sixth diameter D6. In some implementations, the sixth diameter D6 may be substantially equal to (+/−5%) the second diameter D2 of the passage 34.

The distal portion 64 of the inner surface 48 may be provided with a circumferential groove 65 within which is received a sealing member 67, such as an o-ring. The sealing member 67 forming a sealed engagement with the exterior surface of the conduit 14 when the connector assembly 10 is in the locked assembled configuration of FIG. 1B.

The outer surface 46 of the compression member 18 may include an annular tapered (e.g., frustoconically-shaped) portion 68 diverging radially outwardly from the distal end 52 of the compression member 18, and an annular flange or shoulder 70 extending from the tapered portion 68 to the proximal end 50. The tapered portion 68 may define an angle θ3 relative to the axis A1 of the connector assembly 10. The angle θ3 may be substantially equal to the angle θ1 of the tapered surface 40. In this regard, the angle θ3 may be between ten degrees and sixty degrees. In some implementations, the angle θ3 may be substantially equal to thirty degrees. The tapered portion 68 may define a gradually decreasing diameter, including a seventh diameter D7 proximate the distal end 52, and an eighth diameter D8, greater than the seventh diameter D7, proximate the shoulder 70. The shoulder 70 may define a ninth diameter D9 greater than the eighth diameter D8.

The retainer 20 may include a ring portion 74 and a plurality of flexible and/or resilient teeth 76. The ring portion 74 may include a substantially circular shape extending from a proximal end surface 78 to a distal end surface 80 and having an outer diameter D10. The proximal and/or distal end surfaces 78, 80 may include a planar construct delineated by an inner peripheral wall or edge 82 of the retainer 20.

While the retainer 20 is generally shown and described herein as including sixteen teeth 76, it will be appreciated that the retainer 20 may include more or less than sixteen teeth 76 within the scope of the present disclosure. In this regard, a large quantity of teeth 76 can help to reduce the amount of stress imparted on each of the teeth 76 in an assembled configuration (e.g., FIG. 1B). Each of the teeth 76 may include an inner surface 84, an outer surface 86, and a distal end 88. The inner and outer surfaces 84, 86 may extend and diverge radially inwardly from the inner edge 82 of the retainer 20 to the distal end 88, such that the outer surfaces 86 of the teeth 76 collectively define a gradually decreasing diameter D11 extending in a direction away from the distal end surface 80 and the inner surfaces 84 of the teeth 76 collectively define a gradually decreasing diameter D12 extending in a direction away from the distal end surface 80.

A portion of the diameter D11 defined by the outer surfaces 86 may be greater than the diameter D1 of the first connector 16 and/or greater than the diameter D4 of the compression member 18, and a portion of the diameter D11 may be less than the diameter D1 and/or less than the diameter D4. For example, a portion of the diameter D11 proximate the proximal end surface 78 may be greater than the diameter D1 and/or the diameter D4, and a portion of the diameter D11 proximate the distal end 88 of the teeth 76 may be less than the diameter D1 and/or the diameter D4. A portion of the diameter D12 defined by the inner surfaces 84 may be substantially equal to (+/−5%) the diameter D3 of the second conduit 14. For example, a portion of the diameter D12 proximate the distal end 88 of the teeth 76 may be substantially equal to the diameter D3 of the second conduit 14.

The inner and/or outer surfaces 84, 86 may define an angle θ4 relative to the axis A1 of the connector assembly 10. The angle θ4 may be substantially equal to the angle θ2 of the tapered portion 60 of the inner surface 48 of the compression member 18. In this regard, the angle θ4 may be between ten degrees and sixty degrees. In some implementations, the angle θ4 may be substantially equal to thirty degrees.

The second connector 22 included a proximal end 90, a distal end 92, and a passage 94. The proximal end 90 includes an aperture 96 in communication with the passage 94. The distal end 92 also includes an aperture 98 in communication with the passage 94. The passage 94 has a threaded female portion 100 and an engagement surface 102. The threaded female portion 100 is sized to threadably engage the threaded male portion 26 of the first connector 16. The engagement surface 102 diverges radially inwardly (e.g., frustoconically-shaped) relative to the threaded female portion 100. For example, the engagement surface 102 may define an angle θ5 relative to the axis A1 of the connector assembly 10 between ten degrees and ninety degrees. In some implementations, the angle θ5 may be substantially equal to thirty degrees. In this regard, the engagement surface 102 may define an eleventh diameter D13 proximate the threaded female portion 100, and a twelfth diameter D14, less than the eleventh diameter D13, between the eleventh diameter D13 and the proximal end 90 along the axis A1. The eleventh diameter D13 may be substantially equal to the tenth diameter D10 of the retainer 20, and the twelfth diameter D14 may be less than the tenth diameter D10 of the retainer 20.

With reference to FIG. 1A, in an unlocked assembled configuration, the compression member 18 disposed within the first connector 16 such that the annular tapered portion 68 of the compression member 18 engages the annular tapered surface 40 of the first connector 16. The retainer 20 is disposed within the compression member 18 such that the outer surface 86 of the teeth 76 engages the annular tapered portion 60 of the compression member 18. The second connector 22 may be threadably coupled to the first connector 16 at a first location relative to the axis A1 such that the engagement surface 102 engages the proximal end surface 78 of the retainer 20. For example, the engagement surface 102 may engage the proximal end surface 78 proximate the eleventh diameter D13. The second conduit 14 may extend through the first connector 16, the compression member 18, the retainer 20, and the second connector 22. In this regard, in the unlocked assembled configuration, a support member 104 may be disposed within the second conduit 14 to maintain a shape and/or rigidity of the second conduit 14.

With reference to FIG. 1B, in a locked assembled configuration, the second connector 22 is threadably coupled to the first connector 16 at a second location relative to the axis A1. In this regard, the second connector 22 is disposed closer to the first connector 16 in the locked assembled configuration. In the locked assembled configuration, the engagement surface 102 of the second connector 22 applies a force on the proximal end surface 78 in a direction substantially parallel to the axis A1. In some implementations, the proximal end surface 78 may slide along the engagement surface 102 from the unlocked assembled configuration (FIG. 1A) to the locked assembled configuration (FIG. 1B). The axial force may cause the annular tapered portion 60 of the compression member 18, or the annular tapered surface 40 of the first connector 16, to engage the outer surface 86 of the teeth 76 and produce a corresponding force on each of the plurality of teeth 76 in a direction substantially perpendicular to the axis A1. The force on each of the plurality of teeth 76 biases the teeth radially inwardly such that the distal end 88 and/or the inner surface 84 lockingly engages the second conduit 14. The force on each of the plurality of teeth 76 may include an axial force component that biases the compression member 18 into a sealing engagement with the first connector 16. In this regard, in the locked assembled configuration, the distal end 88 of the teeth 76 may engage the stop portion 62 of the compression member 18 to bias the outer surface 46 of the compression member 18 into a sealing engagement with the first connector 16, and the inner surface 48 of the compression member 18 into a sealing engagement with the second conduit 14. In this regard, in the locked assembled configuration, a support member 104 may be disposed within the second conduit 14 to maintain a shape and/or rigidity of the second conduit 14.

To disassemble the connector assembly 10, a user may remove the second connector 16 from the first connector 16. Once the second connector 22 has been removed from the first connector 16, the user can remove the compression member 18 and/or the retainer 20 from the second conduit 14.

Figure 7:
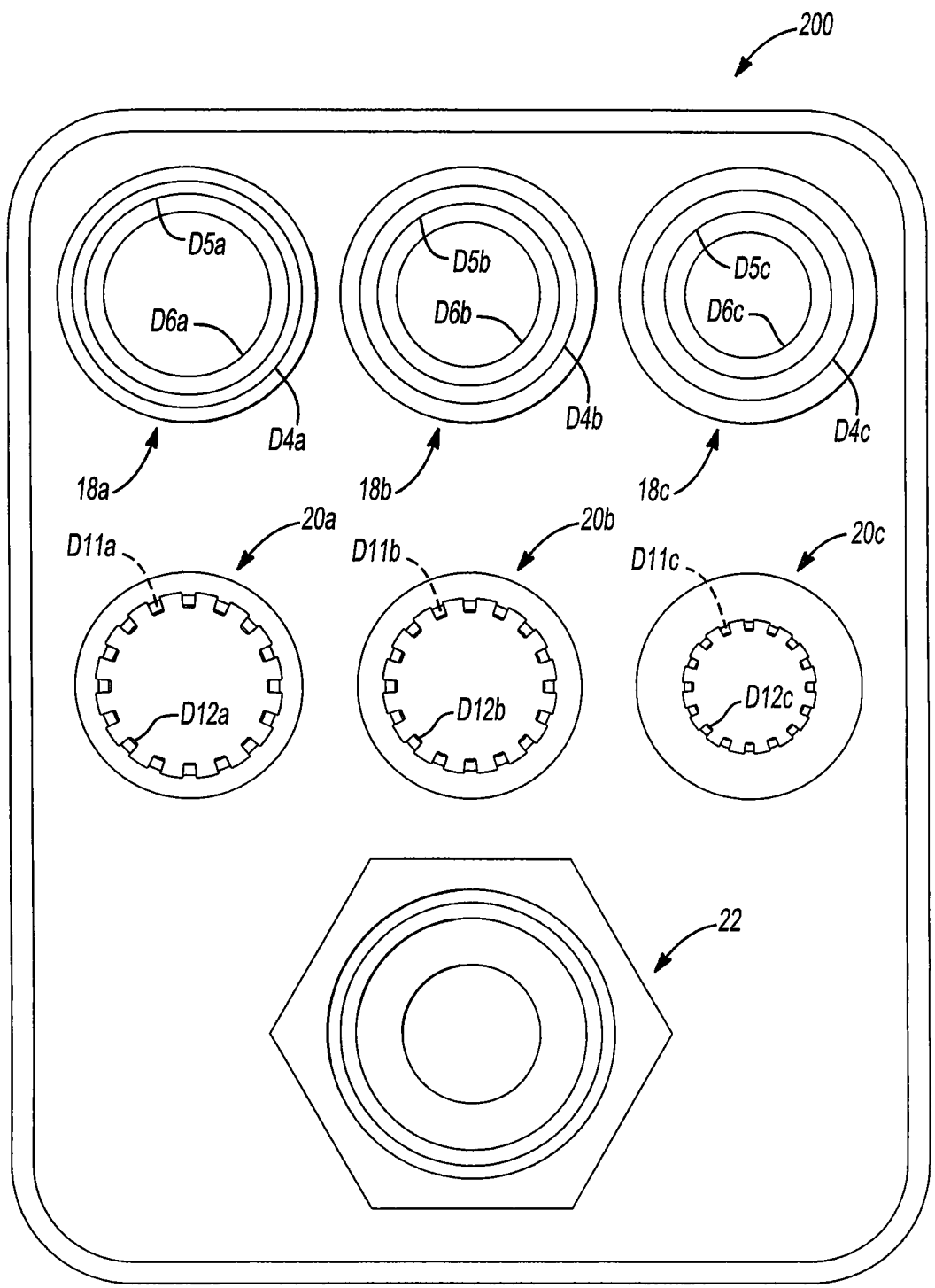
FIG. 7 is a top view of a kit of conduit connector assemblies in accordance with the principles of the present disclosure.

With reference to FIG. 7, a kit 200 is illustrated. The kit 200 may include first, second, and third compression members 18a, 18b, 18c, and first, second, and third retainers 20a, 20b, 20c. While the kit 200 is generally shown and described herein as including three compression members 18a, 18b, 18c and three retainers 20a, 20b, 20c, it will be appreciated that the kit 200 may include more or less than three connector assemblies 10a, 10b, 10c within the scope of the present disclosure. Each compression member 18a, 18b, 18c may be substantially similar to the compression member 18, and each retainer 20a, 20b, 20c may be substantially similar to the retainer 20, except as otherwise provided herein. Accordingly, the structure and/or function of similar features will not be described again in detail. In addition, like reference numerals are used hereinafter and in the drawings to identify like features.

The first compression member 18a may define fourth, fifth, and sixth diameters D4a, D5a, and D6a. The second compression member 18b may define fourth, fifth, and sixth diameters D4b, D5b, and D6b. The third compression member 18c may define fourth, fifth, and sixth diameters D4c, D5c, and D6c. The fourth, fifth, and sixth diameters D4a, D5a, and D6a of the first compression member 18a may be greater than the respective fourth, fifth, and sixth diameters D4b, D5b, and D6b of the second compression member 18b and the respective fourth, fifth, and sixth diameters D4c, D5c, and D6 of the third compression member 18c. The fourth, fifth, and sixth diameters D4b, D5b, and D6b of the second compression member 18b may be greater than the respective fourth, fifth, and sixth diameters D4c, D5c, and D6 of the third compression member 18c.

The first retainer 20a may define an eleventh diameter D11a and a twelfth diameter D12a. The second retainer 20b may define an eleventh diameter D11b and a twelfth diameter D12b. The third retainer 18c may define an eleventh diameter D11c and a twelfth diameter D12c. The eleventh and twelfth diameters D11a, D12a of the first retainer 18a may be greater than the eleventh and twelfth diameters D11b, D12b, respectively, of the second retainer 18b and the eleventh and twelfth diameters D11c, D12c, respectively, of the third retainer 20c. The eleventh and twelfth diameters D11b, D12b of the second retainer 18b may be greater than the eleventh and twelfth diameters D11c, D12c, respectively, of the third retainer 20c. In particular, a minimum value of the eleventh and twelfth diameters D11a, D12a of the first retainer 18a may be greater than a minimum value of the eleventh and twelfth diameters D11b, D12b, respectively, of the second retainer 18b and a minimum value of the eleventh and twelfth diameters D11c, D12c, respectively, of the third retainer 20c. Similarly, a minimum value of the eleventh and twelfth diameters D11b, D12b of the second retainer 18b may be greater than a minimum value of the eleventh and twelfth diameters D11c, D12c, respectively, of the third retainer 20c In an assembled configuration (e.g., FIGS. 1A and 1B), (i) the first compression member 18a and the first retainer 20a may be assembled with the first connector 16, the second connector 22, and a second conduit (e.g., second conduit 14), (ii) the second compression member 18b and the second retainer 20b may be assembled with the first connector 16, the second connector 22, and a second conduit (e.g., second conduit 14), and (iii) the third compression member 18c and the third retainer 20c may be assembled with the first connector 16, the second connector 22, and a second conduit (e.g., second conduit 14). In this regard, the value of the third diameter D3 of the second conduit 14 assembled with the first compression member 18a and the first retainer 20a may be greater than (i) the value of the third diameter D3 of the second conduit 14 assembled with the second compression member 18b and the second retainer 20b and (ii) the value of the third diameter D3 of the second conduit 14 assembled with the third compression member 18c and the third retainer 20c. Similarly, the value of the third diameter D3 of the second conduit 14 assembled with the second compression member 18b and the second retainer 20b may be greater than the value of the third diameter D3 of the second conduit 14 assembled with the third compression member 18c and the third retainer 20c. In this way, the kit 200, including the first, second, and third compression members 18a, 18b, 18c and the first, second, and third retainers 20a, 20b, 20c can allow a user to assemble connector assembly 10 with a second conduit 14 having a third diameter D3 defining a plurality of values.

The configuration of the connector assembly 10 and the kit 200, including the second conduit 14, the first connector 16, the compression member 18, the retainer 20, and the second connector 22 allows a user to quickly create a cost-effective (i) sealed (e.g., engagement between the compression member 18 and the first connector 16 and between the compression member 18 and the second conduit 14), (ii) locked (e.g., engagement between the teeth 76 and the second conduit 14), and (iii) releasable connection between the first conduit 12 and the second conduit 14 by coupling (e.g., threading) the first connector 16 to the second connector 22.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A kit comprising:
a first connector having a threaded coupling portion and an engagement surface;
a first compression member having a first inner surface and a first outer surface, the first inner surface including a first frustoconical portion defining a first diameter and a first distal portion defining a second diameter;
a first retainer having a first ring portion and a first plurality of teeth extending from the first ring portion, each of the first plurality of teeth having a first tapered outer surface and a first tapered inner surface, the first tapered outer surface configured to engage the first frustoconical portion of the first compression member, the first tapered inner surface defining a third diameter;
a second compression member having a second inner surface and a second outer surface, the second inner surface including a second frustoconical portion defining a fourth diameter and a second distal portion defining a fifth diameter, the fourth diameter greater than the first diameter, the fifth diameter greater than the second diameter; and
a second retainer having a second ring portion and a second plurality of teeth extending from the second ring portion, each of the second plurality of teeth having a second tapered outer surface and a second tapered inner surface, the second tapered outer surface configured to engage the second frustoconical portion of the second compression member, the second tapered inner surface defining a sixth diameter greater than the third diameter.

2. The kit of claim 1, wherein the first ring portion includes a first proximal end configured to engage the engagement surface of the first connector, and the second ring portion includes a second proximal end configured to engage the engagement surface of the first connector.

3. The kit of claim 2, wherein the first proximal end defines a first outer diameter and the second proximal end defines a second outer diameter equal to the first outer diameter.

4. The kit of claim 1, wherein the first outer surface is configured to sealingly engage a second connector.

5. The kit of claim 4, wherein the second outer surface is configured to sealingly engage the second connector.

6. The kit of claim 5, wherein the first connector includes a first threaded coupling portion and the second connector includes a second threaded coupling portion configured to engage the first threaded coupling portion.

7. The kit of claim 1, wherein the engagement surface is operable to apply an axially-extending force on the first proximal end of the first retainer and on the second proximal end of the second retainer.

8. The kit of claim 1, wherein the first inner surface of the first compression member is configured to retain a first sealing member that is configured to sealingly engage an outer surface of a conduit and wherein the second inner surface of the second compression member is configured to retain a second sealing member that is configured to sealingly engage an outer surface of a second conduit.

* * * * *